US007071237B2

United States Patent
Ansorge et al.

(10) Patent No.: US 7,071,237 B2
(45) Date of Patent: Jul. 4, 2006

(54) METHOD TO START A PROCESS FOR HYDROCARBONS

(75) Inventors: Joachim Ansorge, The Hague (NL); Joannes Ignatius Geijsel, The Hague (NL)

(73) Assignee: Shell Oil Company, Houston, TX (US)

( * ) Notice: Subject to any disclaimer, the term of this patent is extended or adjusted under 35 U.S.C. 154(b) by 89 days.

(21) Appl. No.: 10/477,743

(22) PCT Filed: May 29, 2002

(86) PCT No.: PCT/EP02/05909

§ 371 (c)(1),
(2), (4) Date: Nov. 25, 2003

(87) PCT Pub. No.: WO02/097737

PCT Pub. Date: Dec. 5, 2002

(65) Prior Publication Data

US 2004/0180972 A1    Sep. 16, 2004

(30) Foreign Application Priority Data

May 29, 2001   (EP) ................... 01304714

(51) Int. Cl.
   *C07C 27/00*    (2006.01)
   *C10G 65/00*    (2006.01)

(52) U.S. Cl. .................. 518/706; 518/700; 518/702; 518/703; 208/59

(58) Field of Classification Search ................ 518/700, 518/702, 703, 705, 706; 208/59
See application file for complete search history.

(56) References Cited

U.S. PATENT DOCUMENTS

| 2,683,158 | A | 7/1954 | Brown et al. | |
|---|---|---|---|---|
| 4,833,170 | A | 5/1989 | Agee | |
| 6,306,917 | B1 * | 10/2001 | Bohn et al. | ................ 518/700 |

FOREIGN PATENT DOCUMENTS

| WO | 93/06041 | 4/1993 |
|---|---|---|
| WO | 94/21512 | 9/1994 |
| WO | 97/12118 | 4/1997 |
| WO | 91/15446 | 10/1997 |

OTHER PUBLICATIONS

International Search Report dated May 16, 2003.

* cited by examiner

*Primary Examiner*—J. Parsa

(57) ABSTRACT

The invention relates to a method to start a process for producing normally gaseous, normally liquid and optionally normally solid hydrocarbons from a hydrocarbonaceous feed, which process involves the steps of:
(i) compressing and optionally separating an oxygen containing gas;
(ii) partial oxidation of the hydrocarbonaceous feed at elevated temperature and pressure using the compressed oxygen containing gas of step (i) to obtain synthesis gas and steam;
(iii) catalytically converting the synthesis gas of step (ii) at elevated temperature and pressure to obtain the normally liquid and/or gaseous hydrocarbons and steam; and
(iv) using steam obtained in step (ii) and/or step (iii) and optionally combusting of hydrocarbons for generating power for providing the pressurized oxygen containing gas for step (i), which method starts with using a hydrocarbonaceous feed fired boiler for providing steam for the generation of power for step (i) for compressing and optionally separating the pressurized oxygen containing gas until step (iv) takes over for providing the power for step (i).

20 Claims, No Drawings

METHOD TO START A PROCESS FOR HYDROCARBONS

FIELD OF THE INVENTION

The present invention relates to a method to start a process for producing normally gaseous, normally liquid and optionally solid hydrocarbons starting from a hydrocarbonaceous feed. In particular the present invention relates to a method to start an integrated, low cost process for the production of hydrocarbons, especially normally liquid hydrocarbons, from natural gas or associated gas, in particular at remote locations as well as at off-shore platforms.

BACKGROUND OF THE INVENTION

Many documents are known describing processes for the conversion of (gaseous) hydrocarbonaceous feedstocks, especially methane, natural gas and/or associated gas, into liquid products, especially methanol and liquid hydrocarbons, particularly paraffinic hydrocarbons. In this respect reference is often made to remote locations and/or off-shore locations, where no direct use of the gas is possible. Transportation of the gas, e.g. through a pipeline or in the form of liquefied natural gas, is not always practical. This holds even more in the case of relatively small gas production rates and/or fields. Reinjection of gas will add to the costs of oil production, and may, in the case of associated gas, result in undesired effects on the crude oil production. Burning of associated gas has become an undesired option in view of depletion of hydrocarbon sources and air pollution.

In WO 94/21512 a process for the production of methanol has been described from an off-shore natural gas field using a floating platform.

In WO 97/12118 a method and system for the treatment of a well stream from an off-shore oil and gas field has been described. Natural gas is converted into syngas using pure oxygen in an autothermal reformer, a combination of partial oxidation and adiabatic steam reforming. The syngas (comprising a considerable amount of carbon dioxide) is converted into liquid hydrocarbons and wax.

In WO 91/15446 a process is described to convert natural gas, particularly remote location natural gas (including associated gas), in the form of normally liquid hydrocarbons suitable for fuel use via methanol/dimethyl ether.

In U.S. Pat. No. 4,833,170 a process is described for the production of heavier hydrocarbons from one or more gaseous light hydrocarbons. The light hydrocarbons are converted into syngas by autothermal reforming with air in the presence of recycled carbon dioxide and steam.

The process for producing normally gaseous, normally liquid and normally solid hydrocarbons from a hydrocarbonaceous feedstock produces during normal operation uses a high amount of energy. This means that in this process any unit operation requiring energy for carrying out its required function this energy is generated and/or provided by other unit operations. This implies also that this production process is not integrated or combined with other systems for temporarily providing heat and power. This is even more true when the production process is carried out at remote and/or stranded gas locations. Although the process for producing hydrocarbons also produces heat and power, the start (or restart) of this process requires energy which is not (at any time) available. It would be useful to provide a method to start up such a process at low (operational) costs.

SUMMARY OF THE INVENTION

The present invention provides for the start of such a process a (conventional) hydrocarbonaceous feed fired boiler which function is only for temporarily providing steam for generation of power to start the process. The temporary use of such a boiler results in lower (operational and capital) costs. This in comparison to the use of available unit operations which provide heat and power but have to be adapted and provided with a more complex construction for providing the steam for the generation of power at the start of the process.

Therefore, the present invention provides a method to start a process for producing normally gaseous, normally liquid and optionally normally solid hydrocarbons from a hydrocarbonaceous feed, which process comprises the steps of:

(i) compressing and optionally separating an oxygen containing gas;
(ii) partially oxidating the hydrocarbonaceous feed at elevated temperature and pressure using the compressed oxygen containing gas of step (i) to obtain synthesis gas and steam;
(iii) catalytically converting the synthesis gas of step (ii) at elevated temperature and pressure to obtain the normally liquid and/or gaseous hydrocarbons and steam; and
(iv) using steam obtained in step (ii) and/or step (iii) and optionally combusting of hydrocarbons for generating power for providing the pressurized oxygen containing gas for step (i), which method starts with using a hydrocarbonaceous feed fired boiler for providing steam for the generation of power for step (i) for compressing and optionally separating the pressurized oxygen containing gas until step (iv) takes over for providing the power for step (i).

An advantage of the present invention is that by the use of a standard boiler of simple and cheap construction, because of the relatively low power temporarily required, steam for the generation of power is provided to start up the process for producing liquid and/or gaseous hydrocarbons at low operational and capital costs. After the start up of the process, the boiler may be shut down or maintained in hot standby mode for emergency situations and still operate at low operational costs. With the process in use, the boiler may be fired with any fuel source originating from the process, especially Fischer-Tropsch off-gas, comprising mainly any unconverted syngas, $C_1$ to $C_4$ hydrocarbons and optionally one or more inert components. Another possibility is e.g. natural gas.

When step (i) of the process comprises at least two compressing and/or optionally separating units then it is not required that the boiler provides steam for the generation of the power for all units. Thus, a boiler is required for providing only the steam(power) for at least one of these units such that step (i) is started. The compressed and optionally separated oxygen containing gas is then used in the start up of step (ii), i.e. the partial oxidation of the hydrocarbonaceous feed at elevated temperature and pressure. This step (ii) is exothermic and provides synthesis gas and steam. Both synthesis gas and steam may be used for providing steam in step (iv). The synthesis gas may be used at least partly for firing the boiler.

When step (ii) comprises at least two partial oxidation reactors and the oxygen containing gas is fed to at least one of the partial oxidation reactors, it is not required to provide for all available partial oxidation reactor pressurized oxygen containing gas which reduces also the steam requirements for the boiler.

Subsequently, after starting the partial oxidation of step (ii) synthesis gas produced in step (ii) is used to start step (iii) for catalytically converting synthesis gas into the normally liquid and/or gaseous hydrocarbons and steam. When starting up step (iii) for catalytically converting the synthesis gas, the boiler may still provide all steam or steam generation at least partly may have been taken over by step (iv).

Part of the hydrocarbons produced in step (iii) may be stored for later use (when the process is in full operation) or used as a feed in step (iv) and/or for firing the boiler. Steam produced in step (iii) may be used in step (i) and/or (iv). In a preferred embodiment, when step (iii) comprises at least two synthesis gas converting reactors and the synthesis gas is fed to at least one of the synthesis gas converting reactors. This reduces in the start up procedure the steam(power) requirement.

If necessary, steam generated in step (ii) and/or step (iii) may be used for further compression of the gas stream produced in step (i) (i.e. compressing oxygen-enriched gas) and/or step (ii) (i.e. compressing synthesis gas).

In a preferred embodiment the process comprises a step (v) of catalytically hydrocracking higher boiling range paraffinic hydrocarbons produced in step (iii). Again, when step (v) comprises at least two catalytically hydrocracking reactors and hydrocarbons produced in step (iii) are fed to at least one catalytically hydrocracking reactor, the steam (power) requirement for the start up of the process is reduced.

It will be evident, that by using the hydrocarbonaceous feed fired boiler in the start up procedure, step (i) is started up under almost constant input conditions for steam and gas feed. This provides a controlled and safe start up of step (i). After the production of compressed oxygen containing gas is continuous and stable, step (ii) is started up. It will be obvious that the other steps (iii) and (iv) and optionally (v) will also be started up under continuous and substantially stable conditions.

This means that the method for starting up the process for producing liquid and/or gaseous hydrocarbons is controlled and safe not only under fresh start conditions but also under restart conditions.

If necessary, an additional compressing unit may be used between step (ii) and (iii). The boiler may in that case also provide the power needed for this compressor at the (re)start. It is also possible to start the compressor after the start of step (iii), using either the boiler or steam generated in steps (ii) and/or (iii).

The hydrocarbonaceous feed suitably is methane, natural gas, associated gas or a mixture of $C_{1-4}$ hydrocarbons. The feed comprises mainly, i.e. more than 90 v/v %, especially more than 94%, $C_{1-4}$ hydrocarbons, especially comprises at least 60 v/v percent methane, preferably at least 75 percent, more preferably 90 percent. Very suitably natural gas or associated gas is used. Suitably, any sulphur in the feedstock is removed.

The normally liquid hydrocarbons mentioned in the present description are suitably $C_{4-24}$ hydrocarbons, especially $C_{5-20}$ hydrocarbons, more especially $C_{6-16}$ hydrocarbons, or mixtures thereof. These hydrocarbons or mixtures thereof are liquid at temperatures between 5 and 30° C. (1 bar), especially at about 20° C. (1 bar), and usually are paraffinic of nature, while up to 24 wt %, preferably up to 12 wt %, of either olefins or oxygenated compounds may be present. Depending on the catalyst and the process conditions used in the Fischer Tropsch reaction, normally gaseous hydrocarbons, normally liquid hydrocarbons and optionally normally solid hydrocarbons are obtained. It is often preferred to obtain a large fraction of normally solid hydrocarbons. These solid hydrocarbons may be obtained up to 85 wt % based on total hydrocarbons, usually between 50 and 75 wt %.

The partial oxidation of gaseous feedstocks, producing mixtures of especially carbon monoxide and hydrogen, can take place according to various established processes. These processes include the Shell Gasification Process. A comprehensive survey of this Process can be found in the Oil and Gas Journal, Sep. 6, 1971, pp 86–90, which is hereby incorporated by reference.

The oxygen containing gas may be air (containing about 21 vol. percent of oxygen), oxygen enriched air, suitably containing up to 70 percent, or substantially pure air, containing typically at least 95 vol. %, usually at least 98 vol. %, oxygen. Oxygen or oxygen enriched air may be produced via cryogenic techniques, but could also be produced by a membrane based process, e.g. the process as described in WO 93/06041 hereby incorporated by reference. The boiler provides the power for driving at least one air compressor or separator of the air compression/separating unit. If necessary, an additional compressing unit may be used between the separation process and step (ii). The boiler in that case may also provide at the (re)start power for this compressor. The compressor, however, may also be started at a later point in time, e.g. after a full start, using steam generated in steps (ii) and/or (iii).

To adjust the $H_2/CO$ ratio in the syngas, carbon dioxide and/or steam may be introduced into the partial oxidation process. Preferably up to 15% volume based on the amount of syngas, preferably up to 8% volume, more preferable up to 4% volume, of either carbon dioxide or steam is added to the feed. Water produced in the hydrocarbon synthesis may be used to generate the steam. As a suitable carbon dioxide source, carbon dioxide from the effluent gasses of the expanding/combustion step may be used. The $H_2/CO$ ratio of the syngas is suitably between 1.5 and 2.3, preferably between 1.8 and 2.1. If desired, (small) additional amounts of hydrogen may be made by steam methane reforming, preferably in combination with the water shift reaction. Any carbon monoxide and carbon dioxide produced together with the hydrogen may be used in the hydrocarbon synthesis reaction or recycled to increase the carbon efficiency. Additional hydrogen manufacture may be an option.

The percentage of hydrocarbonaceous feed which is converted in the first step of the process of the invention is suitably 50–99% by weight and preferably 80–98% by weight, more preferably 85–96% by weight.

The gaseous mixture, comprising predominantly hydrogen, carbon monoxide and optionally nitrogen, is contacted with a suitable catalyst in the catalytic conversion stage, in which the hydrocarbons are formed. Suitably at least 70 v/v % of the syngas is contacted with the catalyst, preferably at least 80%, more preferably at least 90, still more preferably all the syngas.

The catalysts used in step (iii) for the catalytic conversion of the mixture comprising hydrogen and carbon monoxide into hydrocarbons are known in the art and are usually referred to as Fischer-Tropsch catalysts. Catalysts for use in the Fischer-Tropsch hydrocarbon synthesis process frequently comprise, as the catalytically active component, a metal from Group VIII of the Periodic Table of Elements.

Particular catalytically active metals include ruthenium, iron, cobalt and nickel. Cobalt is a preferred catalytically active metal.

The catalytically active metal is preferably supported on a porous carrier. The porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica and titania.

The amount of catalytically active metal on the carrier is preferably in the range of from 3 to 300 pbw per 100 pbw of carrier material, more preferably from 10 to 80 pbw, especially from 20 to 60 pbw.

If desired, the catalyst may also comprise one or more metals or metal oxides as promoters. Suitable metal oxide promoters may be selected from Groups IIA, IIIB, IVB, VB and VIB of the Periodic Table of Elements, or the actinides and lanthanides. In particular, oxides of magnesium, calcium, strontium, barium, scandium, yttrium. lanthanum, cerium, titanium, zirconium, hafnium, thorium, uranium, vanadium, chromium and manganese are most suitable promoters. Particularly preferred metal oxide promoters for the catalyst used to prepare the waxes for use in the present invention are manganese and zirconium oxide. Suitable metal promoters may be selected from Groups VIIB or VIII of the Periodic Table. Rhenium and Group VIII noble metals are particularly suitable, with platinum and palladium being especially preferred. The amount of promoter present in the catalyst is suitably in the range of from 0.01 to 100 pbw, preferably 0.1 to 40, more preferably 1 to 20 pbw, per 100 pbw of carrier.

The catalytically active metal and the promoter, if present, may be deposited on the carrier material by any suitable treatment, such as impregnation, kneading and extrusion. After deposition of the metal and, if appropriate, the promoter on the carrier material, the loaded carrier is typically subjected to calcination at a temperature of generally from 350 to 750° C., preferably a temperature in the range of from 450 to 550° C. The effect of the calcination treatment is to remove crystal water, to decompose volatile decomposition products and to convert organic and inorganic compounds to their respective oxides. After calcination, the resulting catalyst may be activated by contacting the catalyst with hydrogen or a hydrogen-containing gas, typically at temperatures of about 200 to 350° C.

The catalytic conversion process may be performed under conventional synthesis conditions known in the art. Typically, the catalytic conversion may be effected at a temperature in the range of from 100 to 600° C., preferably from 150 to 350° C., more preferably from 180 to 270° C. Typical total pressures for the catalytic conversion process are in the range of from 1 to 200 bar absolute, more preferably from 10 to 70 bar absolute. In the catalytic conversion process mainly (at least 70 wt %, preferably 90 wt % of $C_5+$ hydrocarbons are formed.

Preferably, a Fischer-Tropsch catalyst is used, which yields substantial quantities of paraffins, more preferably substantially unbranched paraffins. A part may boil above the boiling point range of the so-called middle distillates, to normally solid hydrocarbons. A most suitable catalyst for this purpose is a cobalt-containing Fischer-Tropsch catalyst. The term "middle distillates", as used herein, is a reference to hydrocarbon mixtures of which the boiling point range corresponds substantially to that of kerosene and gas oil fractions obtained in a conventional atmospheric distillation of crude mineral oil. The boiling point range of middle distillates generally lies within the range of about 150 to about 360° C.

The higher boiling range paraffinic hydrocarbons, if present, may be isolated and subjected to a catalytic hydro-cracking step (v), which is known per se in the art, to yield the desired middle distillates. The catalytic hydro-cracking is carried out by contacting the paraffinic hydrocarbons at elevated temperature and pressure and in the presence of hydrogen with a catalyst containing one or more metals having hydrogenation activity, and supported on a carrier. Suitable hydrocracking catalysts include catalysts comprising metals selected from Groups VIB and VIII of the Periodic Table of Elements. Preferably, the hydrocracking catalysts contain one or more noble metals from group VIII. Preferred noble metals are platinum, palladium, rhodium, ruthenium, iridium and osmium. Most preferred catalysts for use in the hydro-cracking stage are those comprising platinum.

The amount of catalytically active metal present in the hydrocracking catalyst may vary within wide limits and is typically in the range of from about 0.05 to about 5 parts by weight per 100 parts by weight of the carrier material.

Suitable conditions for the catalytic hydrocracking are known in the art. Typically, the hydrocracking is effected at a temperature in the range of from about 175 to 400° C. Typical hydrogen partial pressures applied in the hydrocracking process are in the range of from 10 to 250 bar.

The process may be operated in a single pass mode ("once through") or in a recycle mode. The process may be carried out in one or more reactors, either parallel or in series. In the case of small hydro-carbonaceous feedstock streams, the preference will be to use only one reactor. Slurry bed reactors, ebulliating bed reactors and fixed bed reactors may be used, the fixed bed reactor being the preferred option.

The product of the hydrocarbon synthesis and consequent hydrocracking suitably comprises mainly normally liquid hydrocarbons, beside water and normally gaseous hydrocarbons. By selecting the catalyst and the process conditions in such a way that especially normally liquid hydrocarbons are obtained, the product obtained ("syncrude") may transported in the liquid form or be mixed with any stream of crude oil without creating any problems as to solidification and or crystallization of the mixture. It is observed in this respect that the production of heavy hydrocarbons, comprising large amounts of solid wax, are less suitable for mixing with crude oil while transport in the liquid form has to be done at elevated temperatures, which is less desired.

The off gas of the hydrocarbon synthesis may comprise normally gaseous hydrocarbons produced in the synthesis process, nitrogen, unconverted methane and other feedstock hydrocarbons, unconverted carbon monoxide, carbon dioxide, hydrogen and water. The normally gaseous hydrocarbons are suitably $C_{1-5}$ hydrocarbons, preferably $C_{1-4}$ hydrocarbons, more preferably $C_{1-3}$ hydrocarbons. These hydrocarbons, or mixtures thereof, are gaseous at temperatures of 5–30° C. (1 bar), especially at 20° C. (1 bar). Further, oxygenated compounds, e.g. methanol, dimethyl ether, may be present in the off gas. The off gas may be utilized for the production of electrical power, in an expanding/combustion process or recycled to the process. The energy generated in the process may be used for own use or for export to local customers. Part of the energy could be used for the compression of the oxygen containing gas.

The process as just described may be combined with all possible embodiments as described in this specification.

In the process of the invention, hydrogen may be separated from the synthesis gas obtained in the first step. The hydrogen is preferably separated after quenching/cooling, and may be separated by techniques well known in the art, as pressure swing adsorption, or, preferably, by means of membrane separation techniques. The hydrogen may be used in a second heavy paraffin synthesis step after the first reactor (provided that a two stage hydrocarbon synthesis is used), or for other purposes, e.g. hydrotreating and/or hydrocracking of hydrocarbons produced in the paraffin synthesis. In this way a further product optimization is obtained (for instance by fine tuning the $H_2$/CO ratio's in the first and second hydrocarbon synthesis step), while also the carbon efficiency can be improved. In addition, the product quality may be improved by e.g. hydrogenation and/or hydrocracking.

Steam generated by the start-up boiler and/or steam generated in step (ii) may also be used to preheat the reactor to be used in step (iii) and/or may be used to create fluidization in the case that a fluidized bed reactor or slurry bubble column is used in step (iii).

Any percentage mentioned in this description is calculated on total weight or volume of the composition, unless indicated differently. When not mentioned, percentages are considered to be weight percentages. Pressures are indicated in bar absolute, unless indicated differently.

We claim:

1. A method for starting a process for producing normally gaseous, normally liquid and optionally normally solid hydrocarbons from a hydrocarbonaceous feed, which process comprises the steps of:
    (i) compressing and optionally separating an oxygen containing gas;
    (ii) partially oxidizing the hydrocarbonaceous feed at elevated temperature and pressure using the compressed oxygen containing gas of step (i) to obtain synthesis gas and steam;
    (iii) catalytically converting the synthesis gas of step (ii) at elevated temperature and pressure to obtain the normally liquid and/or gaseous hydrocarbons and steam; and,
    (iv) using steam or synthesis gas obtained in step (ii) and/or the gaseous hydrocarbons or steam obtained in step (iii) and optionally combusting of hydrocarbons for generating power for providing the pressurized oxygen containing gas for step (i),
which method comprises providing steam for the generation of power for starting step (i) for compressing and optionally separating the pressurized oxygen containing gas via a hydrocarbonaceous feed fired boiler until step (iv) takes over for provision of power for step (i) and wherein the steam, synthesis gas or a mixture thereof obtained in starting step (ii) is used in step (iv).

2. The method of claim 1, wherein step (i) comprises at least two units for compressing and/or optionally separating the oxygen containing gas and the boiler provides steam for the generation of power for at least one of these units.

3. The method as claimed in of claim 1, wherein step (ii) comprises at least two partial oxidation reactors and the oxygen containing gas is fed to at least one of the partial oxidation reactors.

4. The method as claimed in of claim 1, wherein the synthesis gas produced in step (ii) is at least partly used for firing the boiler.

5. The method of claim 1, wherein synthesis gas produced in step (ii) is used to start step (iii) for catalytically converting synthesis gas into the normally gaseous, normally liquid and optionally normally solid hydrocarbons and steam.

6. The method of claim 5, further comprising storing hydrocarbons produced in step (iii) for later use.

7. The method of claim 5, wherein step (iii) comprises at least two synthesis gas converting reactors and the synthesis gas is fed to at least one of the synthesis gas converting reactors.

8. The method of claim 5, wherein the process further comprises step (v) of catalytically hydrocracking higher boiling range paraffinic hydrocarbons produced in step (iii).

9. The method claim 1, in which steam generated in the boiler or step (ii) is used for additional compression after step (i) or (ii) or to preheat the reactor to be used in step (iii) or to create fluidization in the reactor of step (iii).

10. The method of claim 1, wherein step (iv) comprises using steam and/or synthesis gas from step (ii).

11. The method of claim 3, wherein the synthesis gas produced in step (ii) is at least partly used for firing the boiler.

12. The method of claim 3, wherein after starting the partial oxidation of step (ii) synthesis gas produced in step (ii) is used to start step (iii) for catalytically converging synthesis gas into the normally gaseous, normally liquid and optionally normally solid hydrocarbons and steam.

13. The method of claim 4, wherein after starting the partial oxidation of step (ii) synthesis gas produced in step (ii) is used to start step (iii) for catalytically converging synthesis gas into the normally gaseous, normally liquid and optionally normally solid hydrocarbons and steam.

14. The method of claim 5, further comprising using the hydrocarbons produced in step (iii) for firing the boiler.

15. The method of claim 6, wherein step (iii) comprises at least two synthesis gas converting reactors and the synthesis gas is fed to at least one of the synthesis gas converting reactors.

16. The method of claim 6, wherein the process further comprises step (v) of catalytically hydrocracking higher boiling range paraffinic hydrocarbons produced in step (iii), and hydrocarbons produced in step (iii) are fed to at least one catalytically hydrocracking reactor.

17. The method of claim 7, wherein the process further comprises step (v) of catalytically hydrocracking higher boiling range paraffinic hydrocarbons produced in step (iii), and hydrocarbons produced in step (iii) are fed to at least one catalytically hydrocracking reactor.

18. The method of claim 2, in which steam generated in the boiler or step (ii) is used for additional compression after step (i) or (ii) or to preheat the reactor to be used in step (iii) or to create fluidization in the reactor of step (iii).

19. The method of claim 1, in which steam generated in the boiler or step (ii) is used for additional compression after step (i) or (ii) or to preheat the reactor to be used in step (iii) or to create fluidization in the reactor of step (iii).

20. The method of claim 3, in which steam generated in the boiler or step (ii) is used for additional compression after step (i) or (ii) or to preheat the reactor to be used in step (iii) or to create fluidization in the reactor of step (iii).

* * * * *